United States Patent [19]
Ashworth

[11] Patent Number: 5,634,744
[45] Date of Patent: Jun. 3, 1997

[54] CONVEYING LOOSE PARTICULATE MATERIAL PRESENT IN A BODY OF LIQUID

[75] Inventor: Stewart I. Ashworth, Guernsey, Channel Islands

[73] Assignee: Vapormatt Limited, Guernsey, Channel Islands

[21] Appl. No.: 334,626

[22] Filed: Nov. 4, 1994

[30] Foreign Application Priority Data

Nov. 5, 1993 [GB] United Kingdom ............... 9322844

[51] Int. Cl.$^6$ ............................................. B05G 53/00
[52] U.S. Cl. ................................... 406/85; 405/79
[58] Field of Search ..................... 406/85, 50, 73, 406/74, 75, 76; 405/74, 79; 210/527, 533, 803; 417/240; 198/468.9, 468.11

[56] References Cited

U.S. PATENT DOCUMENTS

| | | | |
|---|---|---|---|
| 4,171,852 | 10/1979 | Haentjens | 406/85 |
| 4,278,531 | 7/1981 | Hodgson et al. | 209/11 |

FOREIGN PATENT DOCUMENTS

| | | | |
|---|---|---|---|
| 1361076 | 12/1987 | U.S.S.R. | 406/85 |
| 224351 | 11/1924 | United Kingdom. | |
| 292801 | 6/1928 | United Kingdom. | |
| 595590 | 12/1947 | United Kingdom. | |

*Primary Examiner*—Andrew C. Pike
*Attorney, Agent, or Firm*—Reinhart, Boerner, Van Deuren, Norris & Rieselbach, S.C.

[57] ABSTRACT

A wet-blast machine (1) with a closed-cycle re-use system (2) incorporates apparatus (3) for conveying loose particulate (abrasive) wet-blast material (4) present in a body of water (5). The apparatus (3) comprises a longitudinally extending trough (6), for containing the water (5) and particulate material (4), a support structure (7) movable in a reciprocating manner within the trough (6), and a row of longitudinally spaced flap members (8) attached to and depending from the support structure (7). When the support structure (7) is reciprocated, wave motions are created in the water (5), which move the loose particulate material (4) in a predetermined direction along the trough (6), namely toward a collection point provided by a chute (10).

19 Claims, 6 Drawing Sheets

5,634,744

CONVEYING LOOSE PARTICULATE MATERIAL PRESENT IN A BODY OF LIQUID

This invention relates to conveying loose particulate material present in a body of liquid, and is particularly concerned with conveying, to a collection point, loose particlate abrasive material previously used to clean or otherwise treat the surface of metallic components by wet-blasting.

Wet-blasting comprises discharging a pressurized slurry of abrasive material suspended in a body of water or some other liquid onto the surfaces of the components.

Our UK Patent No. 2,037,197, to which reference is directed, relates to wet-blasting.

After wet-blasting has taken place, the liquid and abrasive material are collected, separated, and subsequently re-used.

The present invention is concerned with conveying the abrasive material towards a collection point while suspended in liquid.

According to one aspect of the present invention, apparatus, for conveying loose particulate material present in a body of liquid, comprises a longitudinally extending trough, for containing the liquid and the particulate material, a support structure movable in a reciprocating manner within the trough, and a row of longitudinally spaced flap members attached to and depending from the support structure, whereby, with liquid in the trough, when the support structure is reciprocated, wave motions are created in the liquid which move the loose particulate material along the trough.

According to another aspect of the present invention, a method, of conveying loose particulate material present in a body of liquid along a trough, comprises creating wave motions in said body of liquid, so as to move said material in a predetermined direction.

The invention also comprises the combination of apparatus as set forth in the penultimate paragraph, and a wet-blast machine.

The two aspects of the invention will now be described, by way of example only, with reference to the accompanying drawings, wherein.

Figure 1:
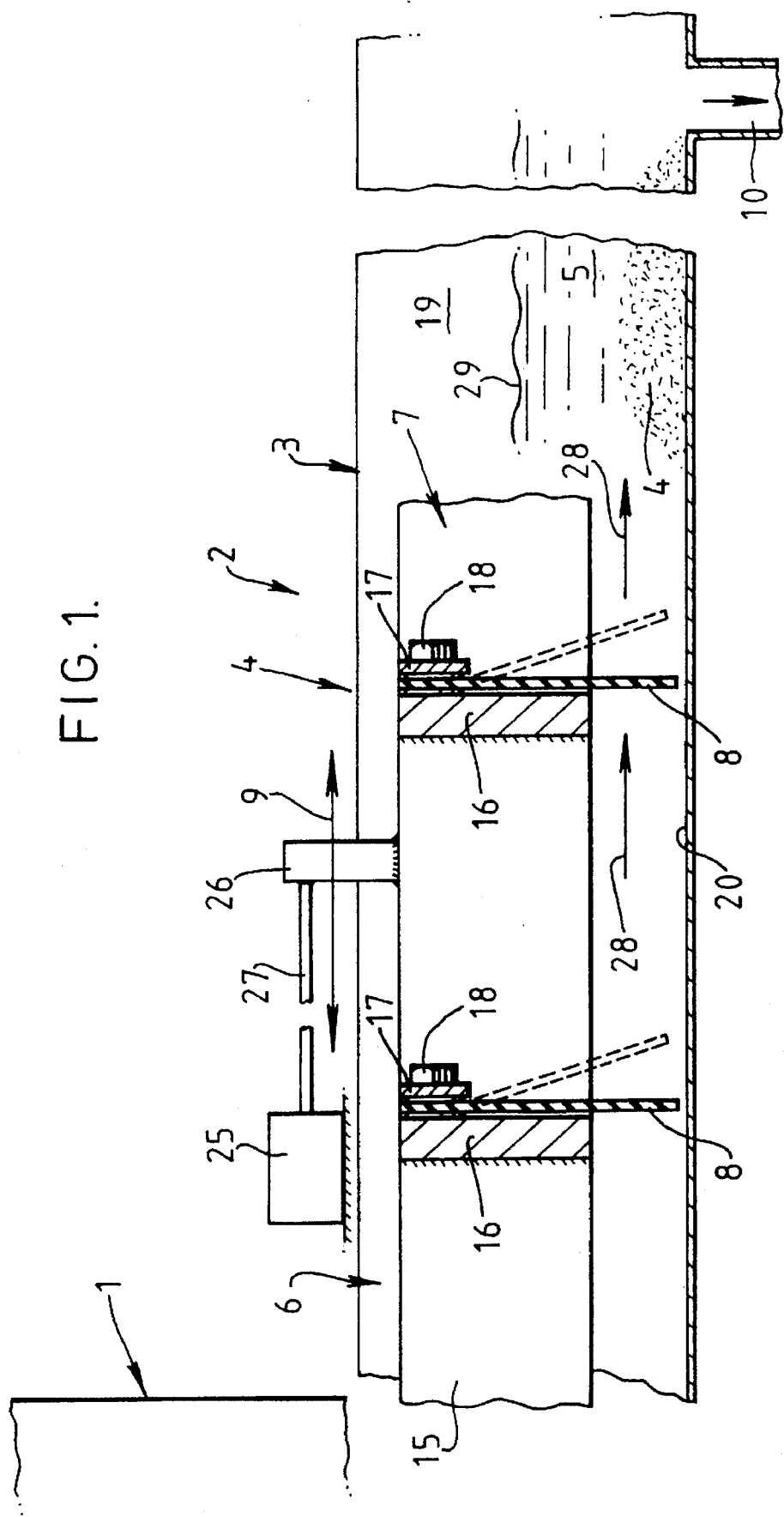
FIG. 1 is a fragmentary side view, in medial section, showing an embodiment of the invention.
Figure 6:
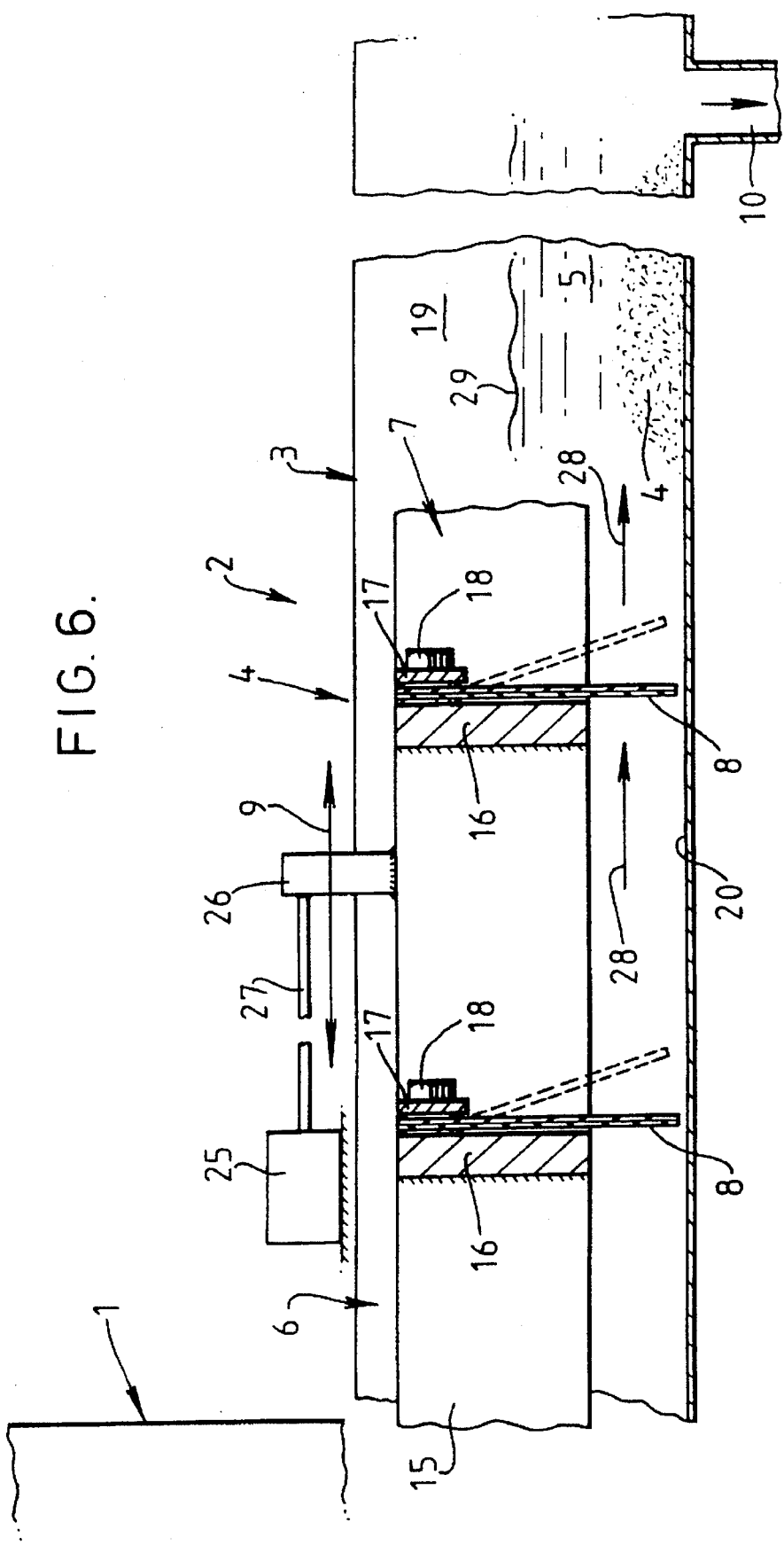
FIG. 6 is a fragmentary side view in medial section, showing another embodiment of the invention.

With reference to FIGS. 1 and 6, a wet-blast machine 1 is provided with a closed-cycle re-use system 2.

The system 2 incorporates apparatus 3 for conveying loose particulate (abrasive) material 4 present in a body of water 5. The apparatus 3 comprises a longitudinally extending trough 6, for containing the water 5 and particulate material 4, a support structure 7 movable in a reciprocating manner within the trough 6, and a row of longitudinally spaced flap members 8 attached to and depending from the support structure 7.

When the support structure 7 is reciprocated, as indicated by the double-headed arrow 9, wave motions are created in the water 5, which move the loose particulate material 4 in a predetermined direction along the trough 6, namely towards a collection point provided by a chute 10.

The water 5 and particulate material 4 previously formed an abrasive slurry employed by the wet-blast machine 1.

An embodiment of a wet-blast machine and examples of slurry materials are disclosed by the above-mentioned UK Patent No. 2,037,197.

Figure 2:
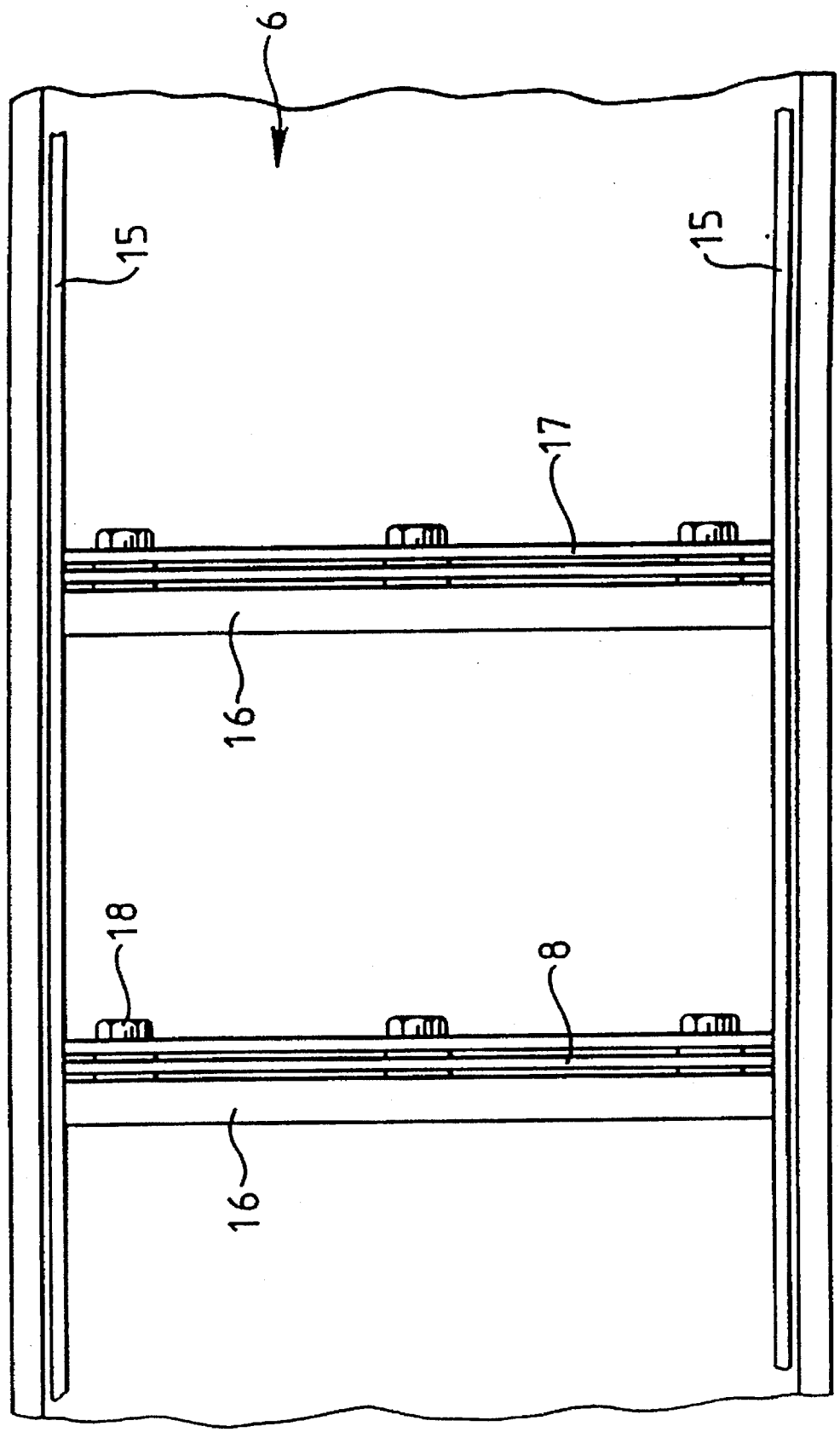
FIG. 2 shows a top, longitudinal partial view of the support structure of the embodiment of FIG. 1.

As shown in the top view of FIG. 2, the support structure of the system 2 in FIG. 1 is of grid-like form, and comprises a pair of laterally spaced longitudinal members 15 interconnected by laterally extending cross-members 16. The structure extends substantially the whole width of the trough 6.

The flap members 8 comprise sheets of rubber or like flexible material. They are demountably attached to the cross-members 16 by backing strips 17 secured to the members 16 by bolts 18.

The flap members 8, which have a thickness of about 3.0 to 4.0 mm, extend across substantially the whole width of the interior 19 of the trough 6 and in close proximity to the bottom 20 thereof. The flap members 8 are disposed at about 25.0 cm intervals along the structure 7.

The support structure 7 is moved in a reciprocating manner by an actuator 25, coupled to an anchorage pillar 26 fixed to the structure 7 by an actuating shaft 27. The stroke of reciprocal movement is larger than the pitch of the flap members 8, say about 30.0 cm.

In operation, the support structures 7 and flap members 8 are moved so as to create wave motions in the water 5, represented by arrows 28. The level of water 5 is indicated by reference 29, and the structure 7 is sufficiently immersed in the water whereby the cross-members 16, assisted by the flap members 8, create the wave motions 28, which push the particulate material 4 along the bottom 20 of the trough 6, in a series of steps.

In the example illustrated, a flap member 8 is of single thickness, but could be replaced by more than one flap of thinner material, so that the total thickness, and its effect, remains substantially the same.

As the support structure 7 is reciprocated, the flap members 8 flex whereby in one direction, (towards the right in the drawing), they assist in creating wave motions 28, and in the opposite direction, they bend back (as shown in dotted lines) to provide less resistance on the return stroke and to ride over any particulate material present. A flap member 8 thus performs in a manner similar to that of a one-way valve.

Figure 3:
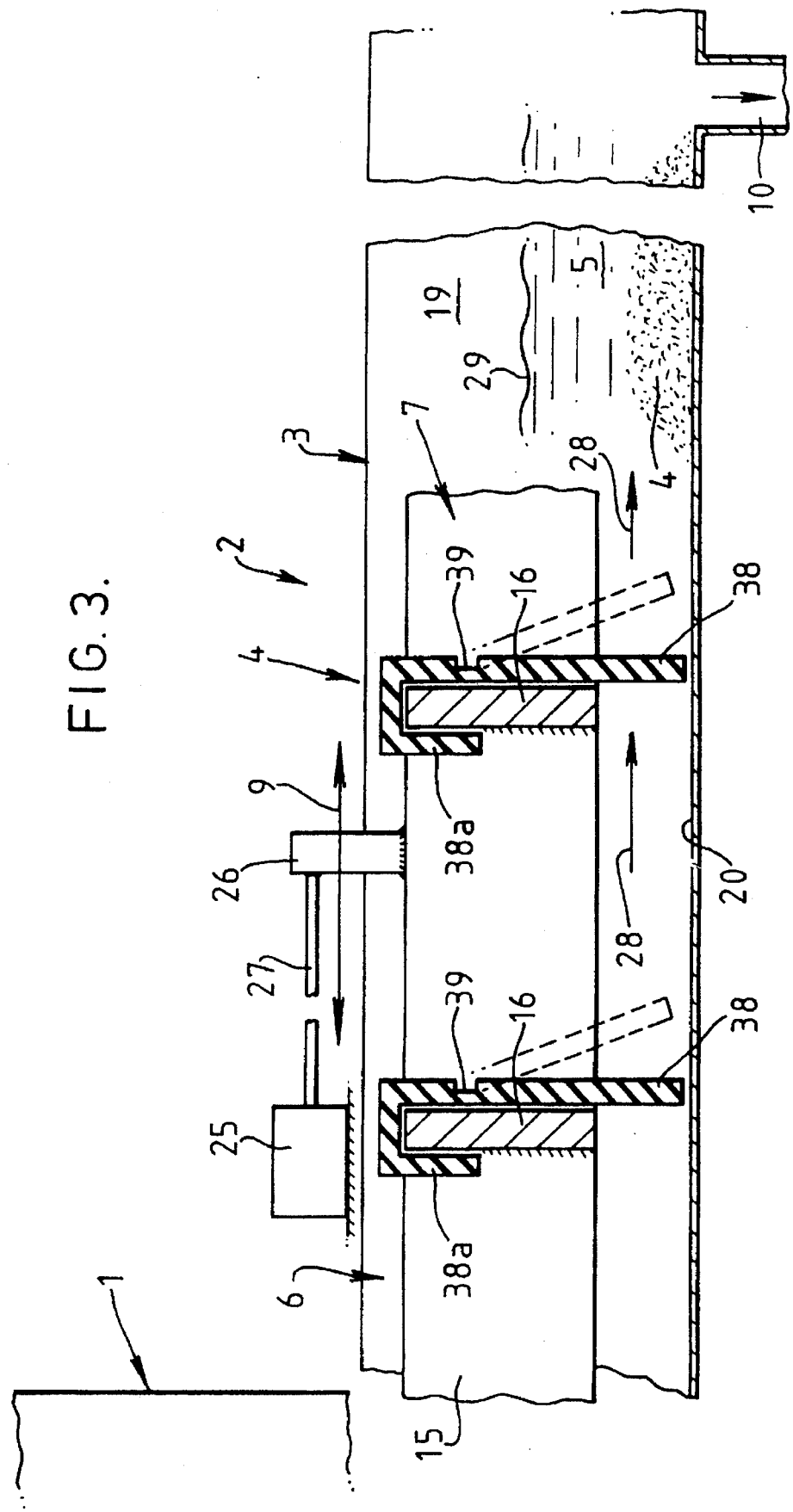
FIG. 3 is a fragmentary side view, in medial section, showing an alternative embodiment of the invention.
Figure 4:
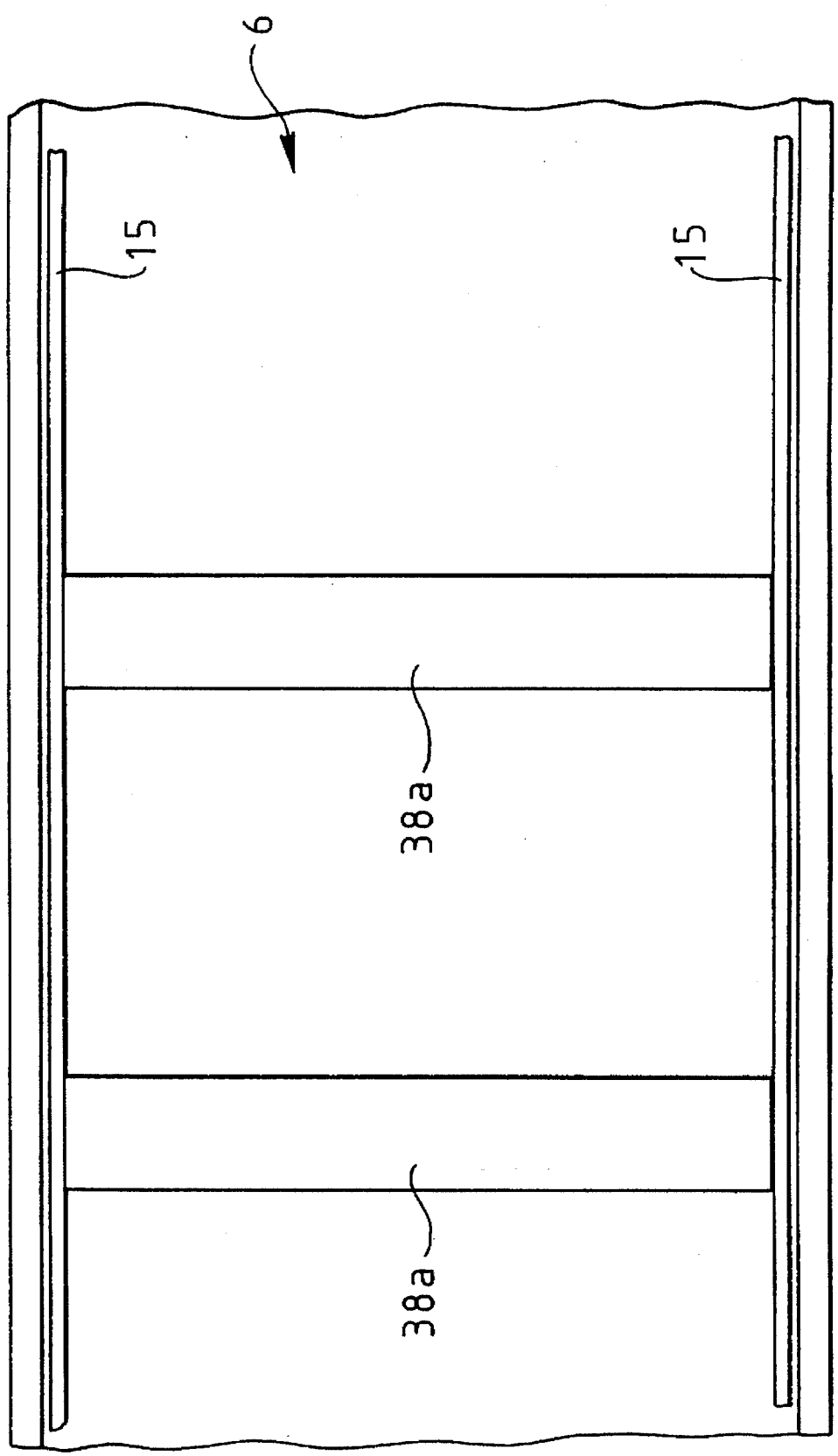
FIG. 4 is a top longitudinal partial view of the support structure of the embodiment of FIG. 3.

In another embodiment shown in FIG. 3, the system 2 shows an alternative form of flap member, namely flap member 38. This component comprises a moulding with an inverted U-shaped portion 38a, which snaps over a cross-member 16. To ensure flexibility, the moulding is formed with a relief slot 39. In FIG. 4 a top view of the support structure for the embodiment of FIG. 3 is shown having the inverted U-shaped portion 38G and the cross member 15.

A flap member 38 preferably has a thickness of about 4.0 to 6.0 mm.

Figure 5:
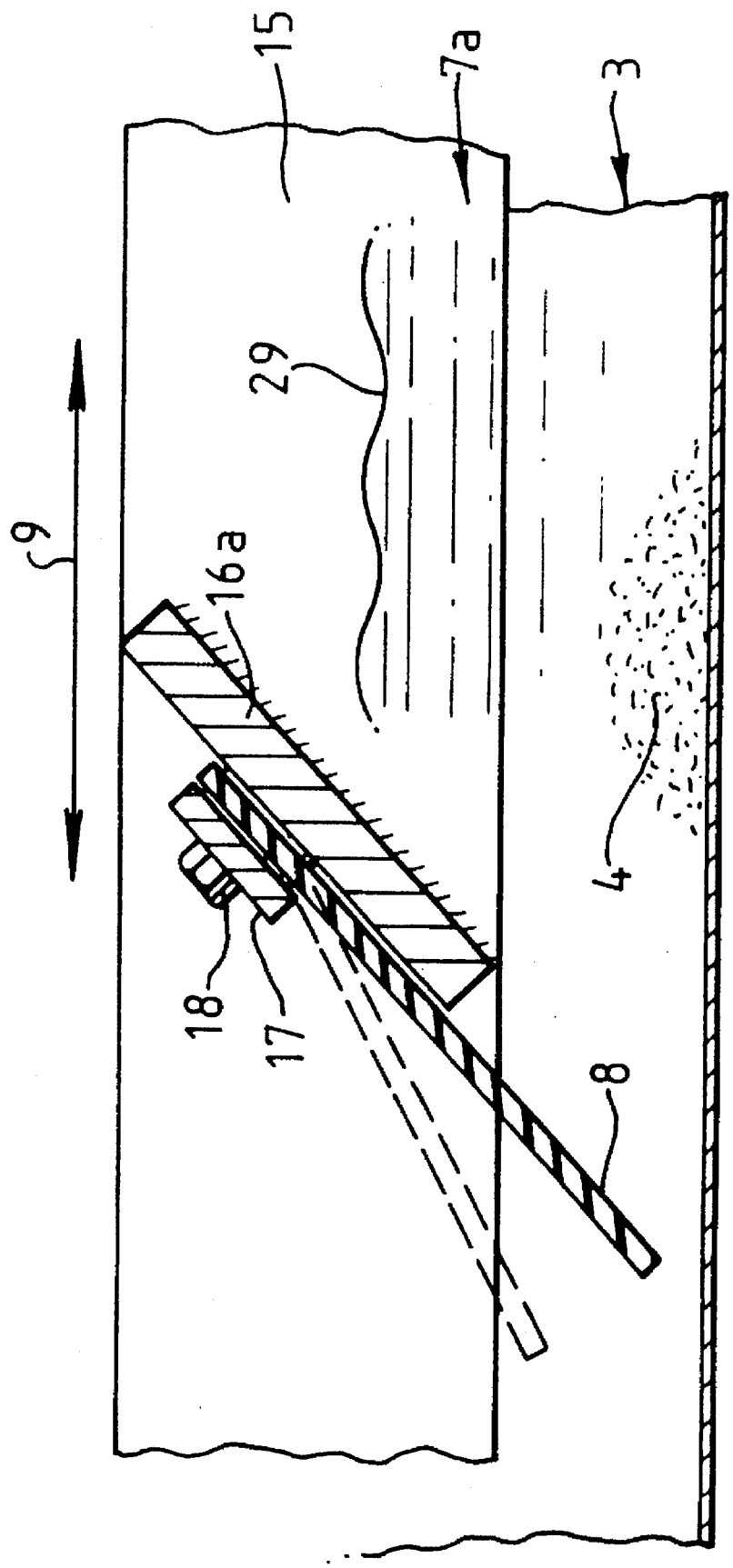
FIG. 5 is a fragmentary partial view of a flap member inclined at about 45° to the longitudinal axis in an alternative embodiment of the invention.

FIG. 5 shows a further modified arrangement wherein a support structure 7a is provided with cross-members 16a, which are inclined to the vertical. The preferred angle of inclination is up to 45% from the vertical.

The advantage of inclined cross-members is that on the forward stroke of the support structure 7a a relatively high pressure wave is created which deflects the flap member 8 rearwardly, and on the return or rearward stroke, a relatively low pressure wave is created whereby water climbs up the back of the cross-member 16a, and helps to restore the flap member to its original position.

The difference in pressure wave magnitude helps to move material 4 along the trough 3.

FIG. 5 also shows the use of flap members 8 demountably attached to the cross-members 16a by backing strips 17 and bolts 18 disposed on the back faces of the cross-members. However, flap members 38 may be used with particular advantage in this modification as they are stiffer than flap member 8.

The invention has been conceived for use with bodies of liquids. Conveying apparatus designed for conveying any particulate materials along a trough have been employed by the Applicant for use with wet-blast machines, but have proved relatively inefficient for that purpose.

What is claimed is:

1. Apparatus for conveying loose particulate material present in a body of liquid, said apparatus comprising a longitudinally extending trough, for containing the body of liquid and the particulate material, a support structure movable in a reciprocating manner within the trough, and a row of longitudinally spaced flap members attached to and depending from the support structure, whereby, with the liquid in the trough, when the support structure is reciprocated, wave motions are created in the liquid which move the loose particulate material along the trough.

2. Apparatus as claimed in claim 1, wherein the flap members extend across substantially a whole width of the trough, and in close proximity to a bottom thereof.

3. Apparatus as claimed in claim 1, wherein the support structure comprises a pair of laterally spaced longitudinal members interconnected by laterally extending cross-members.

4. Apparatus as claimed in claim 1, wherein the flap members comprise sheets of flexible material demountably attached to the support structure.

5. Apparatus as claimed in claim 4, wherein the flap members comprise sheets of flexible material demountably attached to the support structure, each flap member comprising more than one sheet of flexible material.

6. Apparatus as claimed in claim 1, wherein the support structure comprises a pair of laterally spaced longitudinal members interconnected by laterally extending cross-members, and wherein one of said flap members is formed so as to fit over one of the cross-members and to then depend therefrom.

7. Apparatus as claimed in claim 6, wherein one of said flap members comprises a moulding.

8. Apparatus as claimed in claim 1, wherein at least one of the flap members is attached to the support structure so as to be inclined from vertical.

9. Apparatus as claimed in claim 8, wherein at least one of the flap members is inclined up to 45% from the vertical.

10. The apparatus as claimed in claim 1, further including a wet-blasting machine, said particulate material having been previously used by said wet-blast machine.

11. A method of conveying loose particulate material present in a body of liquid along an open trough, comprising the steps of (a) creating wave motions in said body of liquid and (b) moving said material by said wave motions in a predetermined direction along the open trough.

12. The method of conveying the loose particulate material as claimed in claim 11, wherein the step of creating wave motion includes at least in part moving flap members extending across substantially a whole width of the trough, and in close proximity to a bottom thereof.

13. The method of conveying the loose particulate material as claimed in claim 12, wherein the step of creating wave motion includes moving a support structure for the flap members and said support structure comprises a pair of laterally spaced longitudinal members interconnected by laterally extending cross-members.

14. The method of conveying the loose particulate material as claimed in claim 13, wherein the step of creating wave motion includes moving a moulding coupled to at least one of said flap members.

15. The method of conveying the loose particulate material as claimed in claim 12, wherein the step of creating wave motion includes moving the flap member which comprise sheets of flexible material demountably attached to a support structure.

16. The method of conveying the loose particulate material as claimed in claim 15, wherein the step of creating wave motion includes moving the flap members which comprise sheets of flexible material demountably attached to the support structure, each flap member comprising more than one sheet of flexible material.

17. The method of conveying the loose particulate material as claimed in claim 15, wherein the step of creating wave motion includes moving at least one of the flap members which is attached to the support structure so as to be inclined from vertical.

18. The method of conveying the loose particulate material as claimed in claim 12, wherein the step of creating wave motion includes moving at least one of the flap members which is inclined up to 45% from the vertical.

19. Apparatus for conveying loose particulate material present in a body of liquid, the apparatus comprising a longitudinally extending trough, for containing the liquid and the particulate material, a support structure comprising a pair of laterally spaced longitudinal members interconnected by laterally extending cross-members and movable in a reciprocating manner within the trough, and a row of longitudinally spaced, flexible flap members extending across substantially a whole width of the trough, and in close proximity to a bottom thereof, and demountably attached to and depending from the support structure, whereby, with the liquid in the trough, when the support structure is reciprocated, wave motions are created in the liquid which move the loose particulate material along the trough.

* * * * *